United States Patent
Shan

(10) Patent No.: US 10,795,215 B2
(45) Date of Patent: Oct. 6, 2020

(54) DISPLAY PANEL AND DISPLAY DEVICE

(71) Applicant: HKC Corporation Limited, Shenzhen, Guangdong (CN)

(72) Inventor: Jianfeng Shan, Guangdong (CN)

(73) Assignee: HKC Corporation Limited, Shenzhen (CN)

( * ) Notice: Subject to any disclaimer, the term of this patent is extended or adjusted under 35 U.S.C. 154(b) by 0 days.

(21) Appl. No.: 16/398,217

(22) Filed: Apr. 29, 2019

(65) Prior Publication Data
US 2020/0110299 A1 Apr. 9, 2020

Related U.S. Application Data

(63) Continuation of application No. PCT/CN2018/123249, filed on Dec. 24, 2018.

(30) Foreign Application Priority Data

Oct. 8, 2018 (CN) .......................... 2018 1 1170305

(51) Int. Cl.
*G02F 1/1339* (2006.01)
*G02F 1/1368* (2006.01)
*G02F 1/1362* (2006.01)

(52) U.S. Cl.
CPC ........ *G02F 1/13394* (2013.01); *G02F 1/1368* (2013.01); *G02F 1/13392* (2013.01); *G02F 1/136209* (2013.01); *G02F 2001/13396* (2013.01); *G02F 2001/13398* (2013.01); *G02F 2001/136222* (2013.01)

(58) Field of Classification Search
CPC ............... G02F 1/1335; G02F 1/13394; G02F 1/13392; G02F 1/133514; G02F 1/133512; G02F 1/1339; G02F 1/1368; G02F 1/136209; G02F 2001/134345; G02F 2001/13398; G02F 2001/136222; G02F 2001/13396
See application file for complete search history.

(56) References Cited

U.S. PATENT DOCUMENTS

| 2007/0002263 A1* | 1/2007 | Kim ..................... G02F 1/13394 349/156 |
| 2016/0349562 A1* | 12/2016 | Hashimoto ........... G02F 1/1368 |
| 2018/0173034 A1* | 6/2018 | Yonemura ............. G02F 1/1339 |

FOREIGN PATENT DOCUMENTS

| CN | 1982990 A | 6/2007 |
| CN | 103969891 A | 8/2014 |

(Continued)

*Primary Examiner* — Thoi V Duong

(57) ABSTRACT

The present disclosure provides a display panel and a display device, the display panel includes a substrate; a display area, defined at a surface of the substrate, the display area includes a plurality of unit pixel areas, an outer edge of one of the unit pixel areas encloses to form area A1; a photo spacer, including a main photo spacer, one end of the main photo spacer fixedly connects to the substrate, an outer edge of the other end of the main photo spacer encloses to form area A2, A1 and A2 satisfy a relationship: $0.0001 \leq A2/A1 \leq 0.0004$; and/or, the photo spacer includes an auxiliary photo spacer, one end of the main photo spacer fixedly connects to the substrate, an outer edge of the other end of the auxiliary photo spacer encloses to form an area A3, A1 and A3 satisfy a relationship: $1/100 < A3/A1 \leq 1$.

18 Claims, 1 Drawing Sheet

(56) References Cited

FOREIGN PATENT DOCUMENTS

| | | |
|---|---|---|
| CN | 106054466 A | 10/2016 |
| CN | 106773360 A | 5/2017 |
| CN | 107656403 A | 2/2018 |
| KR | 1020060022832 A | 3/2006 |

* cited by examiner

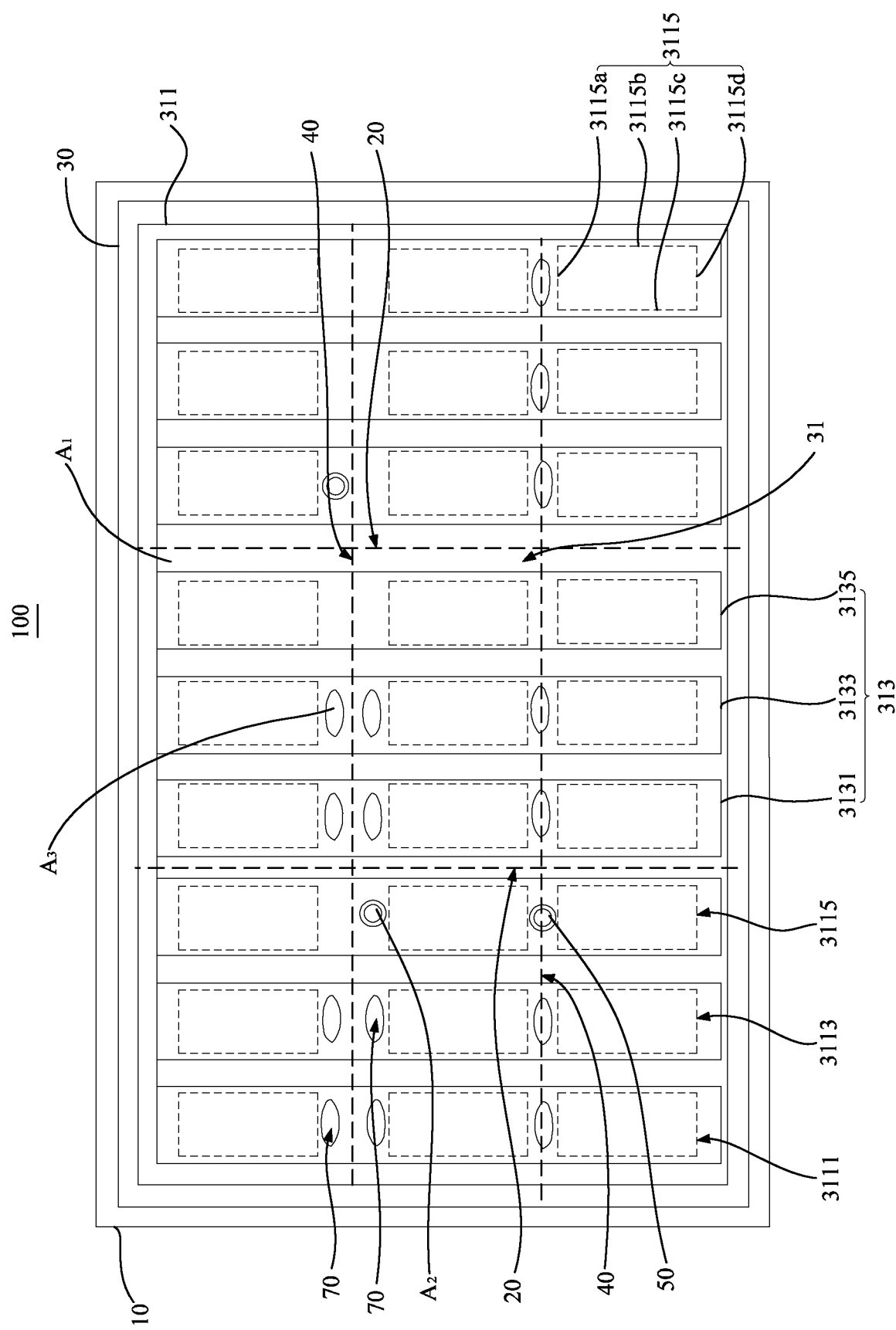

DISPLAY PANEL AND DISPLAY DEVICE

CROSS-REFERENCE TO RELATED APPLICATIONS

The present application is a Continuation Application of International Application PCT/CN2018/123249, filed on Dec. 24, 2018, which claims the benefit of Chinese Patent Application No. CN201811170305.1, filed Oct. 8, 2018, with the State Intellectual Property Office and entitled "display panel and display device", the entirety of which is hereby incorporated herein by reference.

TECHNICAL FIELD

The present disclosure generally relates to the technical field of display, and more particularly relates to a display panel, and a display device.

BACKGROUND

Liquid crystal displays are the mainstream displays at present. The liquid crystal display mainly includes a polarizer, a backlight source, a color film substrate, an array substrate, and a liquid crystal located between the color film substrate and the array substrate. A gap between the color film substrate and the array substrate filled with liquid crystal is called cell gap. The uniformity of cell gap is an important technical index to measure the quality of liquid crystal display. In order to maintain the uniformity of cell gap, the most widely used method now is to provide photo spacers on the color film substrate and the array substrate to support the substrate.

Generally, the photo spacer is formed on the color film substrate by exposure, and the photo spacer includes two kinds including main photo spacer and auxiliary photo spacer. When the color film substrate and the array substrate are made to face each other, the top of the main photo spacer resists the array substrate to first play a supporting role and generate a certain deformation, the main photo spacer plays a major role in maintaining the uniformity of the thickness of the cell gap. Generally, the top of the auxiliary photo spacer does not contact the array substrate and does not deform. Only when an external pressure is applied to the liquid crystal display or the liquid crystal display is under a low temperature, the auxiliary photo spacer would resist the array substrate and really play a supporting role.

In order to ensure that the liquid crystal display has good display quality even when the liquid crystal display is under pressure, it is required that the liquid crystal display should have a certain compressive capacity. The compressive capacity of the liquid crystal display depends on the support force that the photo spacer can provide. When the support force provided by the photo spacer is not enough to counter the external pressure, the photo spacer may shift or deform or even be damaged, resulting in poor display (there may occur liquid crystal bubbles or uneven display brightness) and thus the display cannot work properly.

SUMMARY

It is therefore one main object of the disclosure to provide a display panel, which aims to ensure that the display panel may not display badly and can still maintain the normal working state when be pressed.

In order to realize the above aim, the display panel provided by the present disclosure includes:

a substrate;

a display area, defined at a surface of the substrate, the display area includes a plurality of unit pixel areas, the plurality of unit pixel areas are uniformly defined at the surface of the substrate, and an outer edge of one of the unit pixel areas encloses to form an area A1; and a photo spacer, the photo spacer includes a main photo spacer, one end of the main photo spacer fixedly connects to the substrate, an outer edge of the other end of the main photo spacer encloses to form an area A2, and A1 and A2 satisfy a relationship: $0.0001 \leq A2/A1 \leq 0.0004$;

and/or, the photo spacer further includes an auxiliary photo spacer, one end of the main photo spacer fixedly connects to the substrate, an outer edge of the other end of the auxiliary photo spacer encloses to form an area A3, and A1 and A3 satisfy a relationship: $1/100 < A3/A1 \leq 1$.

In some embodiments of the present disclosure, A1 and A2 satisfy the relationship: $0.0002 \leq A2/A1 \leq 0.0003$;

and/or, A1 and A3 satisfy the relationship: $0.8 \leq A3/A1 \leq 0.9$.

In some embodiments of the present disclosure, the photo spacer is a columnar block or a tapered block, and A2 is an area of an end surface of the main photo spacer away from the substrate;

A3 is an area of an end surface of the auxiliary photo spacer away from the substrate.

In some embodiments of the present disclosure, the unit pixel region includes a light shielding layer attached to a surface of the substrate, the light shielding layer defines a light transmission part, the unit pixel region further includes a color filter layer covering the light transmission part, and A1 is the area formed by enclosing an outer contour of a projection of the light shielding layer on the substrate.

In some embodiments of the present disclosure, the photo spacer includes a photo spacer body, and a metal component defined at the top of the photo spacer body.

In some embodiments of the present disclosure, the auxiliary photo spacer and the main photo spacer are separated from each other by at least one unit pixel area.

In some embodiments of the present disclosure, the height of the main photo spacer is higher than that of the auxiliary photo spacer, and a step difference h between the main photo spacer and the auxiliary photo spacer is 0.15 micrometers to 0.55 micrometers.

In some embodiments of the present disclosure, the display panel further includes a thin film transistor, the main photo spacer and the auxiliary photo spacer both face the thin film transistor, a top end of the main photo spacer abuts the thin film transistor, and a gap is defined between a top end of the auxiliary photo spacer and the thin film transistor.

In some embodiments of the present disclosure, the display panel further includes a thin film transistor and a gate electrode, the main photo spacer faces the thin film transistor, the auxiliary photo spacer faces the gate electrode, a top end of the main photo spacer abuts the thin film transistor, and a gap is defined between a top end of the auxiliary photo spacer and the gate electrode.

The present disclosure further provides a display panel, which includes:

a substrate;

a display area, defined at a surface of the substrate, the display area includes a plurality of unit pixel areas, the plurality of unit pixel areas are uniformly defined at the surface of the substrate, and an outer edge of one of the unit pixel areas encloses to form an area A1; and a photo spacer, the photo spacer includes a main photo spacer, one end of the main photo spacer fixedly connects to the substrate, an outer edge of the other end of the main photo spacer encloses to form an area A2, and A1 and A2 satisfy a relationship: $0.0002 \leq A2/A1 \leq 0.0003$;

and/or, the photo spacer further includes an auxiliary photo spacer, one end of the main photo spacer fixedly connects to the substrate, an outer edge of the other end of the auxiliary photo spacer encloses to form an area A3, and A1 and A3 satisfy a relationship: $0.8 < A3/A1 \leq 0.9$;

the photo spacer is a columnar block or a tapered block, and A2 is an area of an end surface of the main photo spacer away from the substrate;

A3 is an area of an end surface of the auxiliary photo spacer away from the substrate;

the unit pixel region includes a light shielding layer attached to a surface of the substrate, the light shielding layer defines a light transmission part, the unit pixel region further includes a color filter layer covering the light transmission part, and A1 is the area formed by enclosing an outer contour of a projection of the light shielding layer on the substrate;

the color filter layer includes a first color region, a second color region, and a third color region, the first color region and the third color region are respectively defined at two opposite sides of the second color region.

The present disclosure further provides a display device, the display device includes a display panel, the display panel includes:

a substrate;

a display area, defined at a surface of the substrate, the display area includes a plurality of unit pixel areas, the plurality of unit pixel areas are uniformly defined at the surface of the substrate, and an outer edge of one of the unit pixel areas encloses to form an area A1; and a photo spacer, the photo spacer includes a main photo spacer, one end of the main photo spacer fixedly connects to the substrate, an outer edge of the other end of the main photo spacer encloses to form an area A2, and A1 and A2 satisfy a relationship: $0.0001 \leq A2/A1 \leq 0.0004$;

and/or, the photo spacer further includes an auxiliary photo spacer, one end of the main photo spacer fixedly connects to the substrate, an outer edge of the other end of the auxiliary photo spacer encloses to form an area A3, and A1 and A3 satisfy a relationship: $1/100 < A3/A1 \leq 1$.

According to the display panel and the display device provided by the technical solution of the present disclosure, by comparing the area A2 formed by enclosing the top edge of the main photo spacer with the area A1 of the unit pixel, and optimizing the A2/A1 ratio, a reasonable quantity of the main photo spacers can be defined on the display panel, so that the problems of poor support and uneven display brightness due to too few main photo spacers, and the occurrence of the liquid crystal bubbles due to too many main photo spacers can be avoided. Moreover, by comparing the area A3 formed by enclosing the top edge of the auxiliary photo spacer with the area A1 of the unit pixel and optimizing the A3/A1 ratio, a reasonable quantity of auxiliary photo spacers can be defined on the display panel, thus avoiding the problems of poor support and uneven display brightness caused by too few auxiliary photo spacers. In this way, the technical solution of the present disclosure can ensure that the display panel does not display poorly and can still maintain a normal working state when pressed.

BRIEF DESCRIPTION OF THE DRAWINGS

To better illustrate the technical solutions that are reflected in various embodiments according to this disclosure or that are found in the prior art, the accompanying drawings intended for the description of the embodiments herein or for the prior art may now be briefly described, it is evident that the accompanying drawings listed in the following description show merely some embodiments according to this disclosure, and that those having ordinary skill in the art may be able to obtain other drawings based on the arrangements shown in these drawings without making inventive efforts.

The sole FIGURE is a structural diagram of the display panel of the present disclosure according to some embodiments.

The realization of the aim, functional characteristics, advantages of the present disclosure are further described specifically with reference to the accompanying drawings and embodiments.

DETAILED DESCRIPTION

The technical solutions of the embodiments of the present disclosure may be clearly and completely described in the following with reference to the accompanying drawings. It is obvious that the embodiments to be described are only a part rather than all of the embodiments of the present disclosure. All other embodiments obtained by persons skilled in the art based on the embodiments of the present invention without creative efforts shall fall within the protection scope of the present invention.

It is to be understood that, all of the directional instructions in the exemplary embodiments of the present disclosure (such as top, down, left, right, front, back . . . ) can only be used for explaining relative position relations, moving condition of the elements under a special form (referring to FIGURES), and so on, if the special form changes, the directional instructions changes accordingly.

In addition, the descriptions, such as the "first", the "second" in the exemplary embodiment of present disclosure, can only be used for describing the aim of description, and cannot be understood as indicating or suggesting relative importance or impliedly indicating the number of the indicated technical character. Therefore, the character indicated by the "first", the "second" can express or impliedly include at least one character. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not existed, and is not contained in the protection scope required by the present disclosure.

The present disclosure proposes a display panel 100.

Referring to the FIGURE, the display panel 100 provided by the technical solution of the present disclosure includes:

a substrate 10;

a display area 30, defined at a surface of the substrate 10, the display area 30 includes a plurality of unit pixel areas 31, the plurality of unit pixel areas 31 are uniformly defined at the surface of the substrate 10, and an outer edge of one of the unit pixel areas 31 encloses to form an area A1; and a photo spacer, the photo spacer includes a main photo spacer 50, one end of the main photo spacer 50 fixedly connects to the substrate 10, an outer edge of the other end of the main photo spacer 50 encloses to form an area A2, and A1 and A2 satisfy a relationship: $0.0001 \leq A2/A1 \leq 0.0004$;

and/or, the photo spacer further includes an auxiliary photo spacer 70, one end of the main photo spacer 50 fixedly connects to the substrate 10, an outer edge of the other end of the auxiliary photo spacer 70 encloses to form an area A3, and A1 and A3 satisfy a relationship: $1/100 < A3/A1 \le 1$.

According to the display panel 100 and the display device provided by the technical solution of the present disclosure, by comparing the area A2 formed by enclosing the top edge of the main photo spacer 50 with the area A1 of the unit pixel, and optimizing the A2/A1 ratio, a reasonable quantity of the main photo spacers 50 can be defined on the display panel 100, so that the problems of poor support and uneven display brightness due to too few main photo spacers 50, and the occurrence of the liquid crystal bubbles due to too many main photo spacers 50 can be avoided. Moreover, by comparing the area A3 formed by enclosing the top edge of the auxiliary photo spacer 70 with the area A1 of the unit pixel and optimizing the A3/A1 ratio, a reasonable quantity of auxiliary photo spacers 70 can be defined on the display panel 100, thus avoiding the problems of poor support and uneven display brightness caused by too few auxiliary photo spacers 70. In this way, the technical solution of the present disclosure can ensure that the display panel 100 does not display poorly and can still maintain a normal working state when pressed.

It can be understood that the main photo spacer 50 is configured to control the cell gap of the display panel 100, so there are two substrates 10, namely the array substrate 10 and the substrate 10 of the color filter layer 313, and the main photo spacer 50 can be fixed to the array substrate 10 or the substrate 10 of the color filter layer 313 as long as it is convenient to use. The shape of the main photo spacer 50 may be a columnar block or a tapered block. When the top end of the main photo spacer 50 has a circle structure, the diameter of the circle is defined as d2, and $A2 = \pi \times (d2/2)2$. Here, the main photo spacer 50 is set to be columnar or tapered shaped, which is simple in structure, easy to manufacture and soft and beautiful in product lines. Of course, in practice, the main photo spacer 50 may be set in other shapes, for example, the main photo spacer 50 may be set in a polygonal shape. At this time, the main photo spacer 50 is a polygonal boss, and A2 is equal to the area of the outer polygon of the top end of the polygonal boss.

Moreover, A2/A1 ratio can be 0.00013, 0.00015, 0.0006, 0.0008, 0.00031, 0.00033, 0.00035, 0.00037, 0.00039, etc., and A3/A1 ratio can be 0.1, 0.2, 0.3, 0.5, 0.7, 0.8, 0.9, 0.95, 0.97, etc., which can better design the density of the main photo spacer 50 and the auxiliary photo spacer 70 to meet the requirements and prevent uneven brightness of the display panel 100.

In some embodiments of the present disclosure, a shielding black area is also provided on one surface of the substrate 10, and the main photo spacer 50 and the auxiliary photo spacer 70 may also be formed by stacking shielding black areas, the stacking shielding black areas extend from the substrate 10 in a direction away from the substrate 10, where A2 and A3 are areas of the end surfaces of the shielding black area away from the substrate 10. Or by stacking the color filter layer 313 on the substrate 10, where A2 and A3 are the areas of the end surfaces of the color filter layer 313 away from the substrate 10. Since the end surface is the contact surface between the photo spacer and the supported surface, the design density of the photo spacer can be well obtained by comparing the ratio of the contact surface to the supported surface, so that the number of photo spacer can be designed according to the density.

Preferably, A1 and A2 satisfy the relationship: $0.0002 \le A2/A1 \le 0.0003$;

and/or, A1 and A3 satisfy the relationship: $0.8 \le A3/A1 \le 0.9$.

When A2/A1 and A3/A1 are set within the range, a reasonable number of main photo spacers 50 can be well set on the display panel 100, avoiding the problems of uneven display brightness due to the poor support caused by too few main photo spacers 50, and the occurrence of the liquid crystal bubbles due to too many main photo spacers 50. And a reasonable number of auxiliary photo spacers 70 can be well arranged on the display panel 100, avoiding the problem of uneven display brightness due to the poor support caused by too few auxiliary photo spacers 70. It may be understood that the A2/A1 ratio can be 0.00021, 0.00023, 0.00024, 0.00025, 0.00027, 0.00028, 0.00029, etc., and the A3/A1 ratio can be 0.81, 0.83, 0.84, 0.85, 0.86, 0.87, 0.89, etc., all of which can well design the densities of the main photo spacers 50 and the auxiliary photo spacers 70 to meet the requirements and prevent uneven brightness of the display panel 100.

In some embodiments of the present disclosure, the size of the top end of the main photo spacer 50 may be 7 micrometers to 11 micrometers (specifically, 8 micrometers, 9 micrometers, 10 micrometers, etc.) and the size of the top end of the auxiliary photo spacer 70 may be 8 micrometers to 15 micrometers (specifically, 9 micrometers, 10 micrometers, 11 micrometers, 12 micrometers, 13 micrometers, etc.). These dimensions are defined as the radiuses or diameters of the circles when the top end of the main photo spacer 50 and/or the auxiliary photo spacer 70 are arranged in the circular shape. When the top ends of the main photo spacer 50 and/or the auxiliary photo spacer 70 are arranged in the oval shape, these dimensions are defined as the long axis or minor axis of the oval. These dimensions are defined as the side lengths of the ellipse when the top ends of the main photo spacer 50 and/or the auxiliary photo spacer 70 are arranged in the quadrilateral shape.

In some embodiments of the present disclosure, the unit pixel region 31 includes a light shielding layer 311 attached to a surface of the substrate 10, the light shielding layer 311 defines a light transmitting portion, the unit pixel region 31 also includes a color filter layer 313 covering the light transmitting portion, and A1 is the area of a projection of the outer contour of the light shielding layer 311 on the substrate 10. Specifically, the light shielding layer 311 of the unit pixel region 31 defines a left light transmitting portion 3111, a middle light transmitting portion 3113, and a right light transmitting portion 3115, each light transmitting portion includes a first long side 3115$a$, a first short side 3115$b$, a second long side 3115$c$, and a second short side 3115$d$ connected end to end. Each of the first long sides 3115$a$ and the second long side 3115$c$ are parallel to each other, and each of the first short side 3115$b$ and the second short side 3115$d$ are parallel to each other. A first midpoint is defined, which is the midpoint of a first connecting line which is perpendicular to the left light transmitting portion 3111 and the right light transmitting portion 3115 of the two adjacent unit pixel regions 31 (specifically, the first connecting line is perpendicular to the first long side 3115$a$ of the left light transmitting portion 3111 and the second long side 3115$c$ of the right light transmitting portion 3115). A first vertical line 20 is defined, which passes through the first midpoint and is perpendicular to the first connecting line. A second midpoint is defined, which is the midpoint of a second connecting line which is perpendicular to the middle light transmitting portions 3113 of the two adjacent unit pixel regions 31 (specifically, the second connecting line is perpendicular to the short sides of the two middle light transmitting portions 3113), and a second vertical line 40 is defined and the second vertical line 40 passes through the second midpoint and is perpendicular to the second line. A1 is the area formed by two adjacent first vertical lines 20 and two adjacent second vertical lines 40, that is, a minimum repeated unit pixel area.

It may be understood that the color filter layer 313 includes a first color region 3131, a second color region 3133 and a third color region 3135. The first color region 3131, the second color region 3133 and the third color region 3135 cover the left light transmission portion 3111, the middle light transmission portion 3113 and the right light transmission portion 3115, respectively. Specifically, the first color region 3131 is a red region, the second color region 3133 is a green region, and the third color region 3135 is a blue region, thereby facilitating the operation of the display panel 100. It may be understood that the first color region 3131, the second color region 3133 and the third color region 3135 in the technical solution of the present disclosure can also be color regions with other colors to enable the interview panel to meet other different display requirements. The first color region 3131, the second color region 3133 and the third color region 3135 are different combinations of blue region, green region and red region, and are also within the scope of protection of this present disclosure.

In some embodiments of the present disclosure, the photo spacer includes a photo spacer body and a metal component on top of the photo spacer body. In some embodiments, all photo spacers can have the structure including the photo spacer body and the metal layer to maximize the support strength of the photo spacers. For the display device in which the photo spacer includes the main photo spacer 50 and the auxiliary photo spacer 70, the body of the main photo spacer 50 and the body of the auxiliary photo spacer 70 with different heights can be formed by the halftone mask process first, and then the metal layer can be formed on the top of the body of the main photo spacer 50 and the top of the body of the auxiliary photo spacer 70 by one patterning process.

Alternatively, all the auxiliary photo spacers 70 may be designed to include the body of the auxiliary photo spacers 70 and the metal layer, and the main photo spacers are of an integral structure to increase the support strength of the auxiliary photo spacers 70. For the display device in which the photo spacer includes the main photo spacer 50 and the auxiliary photo spacer, the main photo spacer 50 and the body of the auxiliary photo spacer with different heights may be formed by the halftone mask process first, and then the metal layer may be formed on top of the body of the auxiliary photo spacer 70 body by one patterning process.

Alternatively, all the main photo spacers 50 may be designed to include a main body and a metal layer of the main photo spacers 50, and the sub-spacers may be integrated to increase the support strength of the main photo spacers 50. For a display device in which the photo spacer includes the main photo spacer 50 and the auxiliary photo spacer 70, the main photo spacer 50 body and the auxiliary photo spacer 70 with different heights may be formed by a halftone mask process first, and then a metal layer may be formed on top of the main body of the main photo spacer 50 by the patterning process.

In some embodiments, the photo spacer body may be made of resin with low hardness such as low hardness polyurethane resin or low hardness polypropylene resin. The metal layer may be made of materials with higher hardness, such as Mo (molybdenum), Al (aluminum), ITO (indium tin oxide), etc. The thickness of the metal layer may preferably be 0.2 micrometers to 0.5 micrometers.

In some embodiments of the present disclosure, the auxiliary photo spacer 70 and the main photo spacer 50 are separated from each other by at least one unit pixel region 31 apart from each other. With this arrangement, it is convenient to find out the main photo spacer 50 quickly and conveniently in the subsequent test of the display device, thereby facilitating the test. It may be appreciated that in order to facilitate the finding of the primary photo spacer 50, the top edges of the main photo spacer 50 and the auxiliary photo spacer 70 may also be arranged in different shapes, for example, the tops of the main photo spacer 50 and the auxiliary photo spacer 70 may be arranged in the circular shape and the oval shape, respectively, so as to facilitate the finding of the main photo spacer 50.

In some embodiments of the present disclosure, the height of the main photo spacer 50 is higher than that of the auxiliary photo spacer 70, and the step difference h between the main photo spacer 50 and the auxiliary photo spacer 70 is 0.15 micrometers to 0.55 micrometers. The display panel 100 includes liquid crystal. When the break difference h is less than 0.15 micrometers, the fluctuation of liquid crystal may decrease, thus affecting the display effect of the display panel 100. When the break difference h is greater than 0.55 micrometers, although the fluctuation of liquid crystal may increase, the main photo spacer 50 may always play the supporting role, and the actual auxiliary photo spacer 70 may hardly play the supporting role, greatly reducing the pressure resistance of the liquid crystal display device and even causing the main photo spacer 50 to be crushed, resulting in poor display. When the value of the break difference h is in the range of 0.15 micrometers to 0.55 micrometers, the display panel 100 can have better compression resistance and satisfy better liquid crystal fluctuation, and its comprehensiveness is better. Specifically, the break difference h can be 0.2 micrometers, 0.3 micrometers, 0.4 micrometers, 0.45 micrometers, 0.5 micrometers, etc., all of which enable the display panel 100 to have a good display effect.

In some embodiments of the present disclosure, the display panel 100 further includes a thin film transistor, the main photo spacer 50 and the auxiliary photo spacer 70 both face the thin film transistor, the top end of the main photo spacer 50 abuts the thin film transistor, and a gap is defined between the top end of the auxiliary photo spacer 70 and the thin film transistor. In some embodiments, the thin film transistor is supported by both the main photo spacer 50 and the auxiliary photo spacer 70, so that the display effect of the display panel 100 can be better and it is convenient to use.

In some embodiments of the present disclosure, the display panel 100 further includes a thin film transistor and a gate electrode, the main photo spacer 50 faces the thin film transistor, the auxiliary photo spacer 70 faces the gate electrode, the top end of the main photo spacer 50 abuts against the thin film transistor, and a gap is defined between the top end of the auxiliary photo spacer 70 and the gate electrode. In some embodiments, the thin film transistor is supported by the main photo spacer 50 and the gate electrode is supported by the auxiliary photo spacer 70, so that the display effect of the display panel 100 can be better and it is convenient to use.

This present disclosure also provides a display device including a display panel 100 whose specific structure can be referred to the above-mentioned embodiments. As the display device adopts all the technical proposals of the above exemplary embodiments, the display device at least has all of the beneficial effects of the technical proposals of the above exemplary embodiments, no need to repeat again.

The display devices provided in the embodiments may be, for example, advanced super dimension Switch (ADS) type, in-plane switching (IPS) type, fringe field switching (FFS) type, multi-domain vertical alignment (MVA) type, pattern vertical alignment (PVA) type, twisted nematic (TN) type, and other types of liquid crystal display devices that need to be provided with photo spacers to support the cell gap. And the display device provided by the embodiments is applicable to any product or component with display functions such as mobile phone, tablet computer, television, displayer, notebook computer, digital photo frame, navigator, etc.

The foregoing description merely depicts some embodiments of the present disclosure and therefore is not intended to limit the scope of the present disclosure. An equivalent structural or flow changes made by using the content of the specification and drawings of the present disclosure, or any direct or indirect applications of the disclosure on any other related fields shall all fall in the scope of the present disclosure.

What is claimed is:

1. A display panel, wherein the display panel comprises:
   a substrate;
   a display area, defined at a surface of the substrate, the display area comprises a plurality of unit pixel areas, the plurality of unit pixel areas are uniformly defined at the surface of the substrate, and an outer edge of one of the unit pixel areas encloses to form an area A1; and
   a photo spacer, the photo spacer comprises main photo spacers, one end of each of the main photo spacers fixedly connects to the substrate, an outer edge of the other end of each of the main photo spacers encloses to form an area A2, and A1 and A2 satisfy a relationship: $0.0001 \leq A2/A1 \leq 0.0004$; and
   the photo spacer further comprises auxiliary photo spacers, one end of each of the auxiliary photo spacers fixedly connects to the substrate, an outer edge of the other end of each of the auxiliary photo spacers encloses to form an area A3, and A1 and A3 satisfy a relationship: $1/100 < A3/A1 < 1$, the auxiliary photo spacer and the main photo spacer are separated from each other by at least one unit pixel area.

2. The display panel according to claim 1, wherein A1 and A2 satisfy the relationship: $0.0002 < A2/A1 < 0.0003$;
   and/or, A1 and A3 satisfy the relationship: $0.8 < A3/A1 < 0.9$.

3. The display panel according to claim 2, wherein the photo spacer is a columnar block or a tapered block, and A2 is an area of an end surface of the main photo spacer away from the substrate;
   A3 is an area of an end surface of the auxiliary photo spacer away from the substrate.

4. The display panel according to claim 3, wherein the unit pixel region comprises a light shielding layer attached to a surface of the substrate, the light shielding layer defines a light transmission part, the unit pixel region further comprises a color filter layer covering the light transmission part, and A1 is the area formed by enclosing an outer contour of a projection of the light shielding layer on the substrate.

5. The display panel according to claim 4, wherein the display panel further comprises a thin film transistor and a gate electrode, the main photo spacer faces the thin film transistor, the auxiliary photo spacer faces the gate electrode, a top end of the main photo spacer abuts the thin film transistor, and a gap is defined between a top end of the auxiliary photo spacer and the gate electrode.

6. The display panel according to claim 3, wherein the display panel further comprises a thin film transistor and a gate electrode, the main photo spacer faces the thin film transistor, the auxiliary photo spacer faces the gate electrode, a top end of the main photo spacer abuts the thin film transistor, and a gap is defined between a top end of the auxiliary photo spacer and the gate electrode.

7. The display panel according to claim 2, wherein the display panel further comprises a thin film transistor and a gate electrode, the main photo spacer faces the thin film transistor, the auxiliary photo spacer faces the gate electrode, a top end of the main photo spacer abuts the thin film transistor, and a gap is defined between a top end of the auxiliary photo spacer and the gate electrode.

8. The display panel according to claim 1, wherein the height of the main photo spacer is higher than that of the auxiliary photo spacer, and a step difference h between the main photo spacer and the auxiliary photo spacer is 0.15 micrometer to 0.55 micrometer.

9. The display panel according to claim 8, wherein the display panel further comprises a thin film transistor, the main photo spacer and the auxiliary photo spacer both face the thin film transistor, a top end of the main photo spacer abuts the thin film transistor, and a gap is defined between a top end of the auxiliary photo spacer and the thin film transistor.

10. The display panel according to claim 9, wherein the display panel further comprises a thin film transistor and a gate electrode, the main photo spacer faces the thin film transistor, the auxiliary photo spacer faces the gate electrode, a top end of the main photo spacer abuts the thin film transistor, and a gap is defined between a top end of the auxiliary photo spacer and the gate electrode.

11. The display panel according to claim 8, wherein the display panel further comprises a thin film transistor and a gate electrode, the main photo spacer faces the thin film transistor, the auxiliary photo spacer faces the gate electrode, a top end of the main photo spacer abuts the thin film transistor, and a gap is defined between a top end of the auxiliary photo spacer and the gate electrode.

12. The display panel according to claim 1, wherein the display panel further comprises a thin film transistor and a gate electrode, the main photo spacer faces the thin film transistor, the auxiliary photo spacer faces the gate electrode, a top end of the main photo spacer abuts the thin film transistor, and a gap is defined between a top end of the auxiliary photo spacer and the gate electrode.

13. The display panel according to claim 1, wherein the display panel further comprises a thin film transistor and a gate electrode, the main photo spacer faces the thin film transistor, the auxiliary photo spacer faces the gate electrode, a top end of the main photo spacer abuts the thin film transistor, and a gap is defined between a top end of the auxiliary photo spacer and the gate electrode.

14. A display panel, wherein the display panel comprises:
   a substrate;
   a display area, defined at a surface of the substrate, the display area comprises a plurality of unit pixel areas, the plurality of unit pixel areas are uniformly defined at the surface of the substrate, and an outer edge of one of the unit pixel areas encloses to form an area A1; and
   a photo spacer, the photo spacer comprises main photo spacers, one end of each of the main photo spacers fixedly connects to the substrate, an outer edge of the other end of each of the main photo spacers encloses to form an area A2, and A1 and A2 satisfy a relationship: $0.0002 \leq A2/A1 \leq 0.0003$; and the photo spacer further comprises auxiliary photo spacers, one end of each of the auxiliary photo spacers fixedly connects to the substrate, an outer edge of the other end of each of the auxiliary photo spacers encloses to form an area A3, and A1 and A3 satisfy a relationship: $0.8 < A3/A1 \leq 0.9$, the auxiliary photo spacer and the main photo spacer are separated from each other by at least one unit pixel area;

the photo spacer is a columnar block or a tapered block, and A2 is an area of an end surface of the main photo spacer away from the substrate;

A3 is an area of an end surface of the auxiliary photo spacer away from the substrate the unit pixel region comprises a light shielding layer attached to a surface of the substrate, the light shielding layer defines a light transmission part, the unit pixel region further comprises a color filter layer covering the light transmission part, and A1 is the area formed by enclosing an outer contour of a projection of the light shielding layer on the substrate;

the color filter layer comprises a first color region, a second color region, and a third color region, the first color region and the third color region are respectively defined at two opposite sides of the second color region.

15. A display device wherein, the display device comprises a display panel, the display panel comprises:

a substrate;

a display area, defined at a surface of the substrate, the display area comprises a plurality of unit pixel areas, the plurality of unit pixel areas are uniformly defined at the surface of the substrate, and an outer edge of one of the unit pixel areas encloses to form an area A1; and a photo spacer, the photo spacer comprises main photo spacers, one end of each of the main photo spacers fixedly connects to the substrate, an outer edge of the other end of each of the main photo spacers encloses to form an area A2, and A1 and A2 satisfy a relationship: $0.0001 \leq A2/A1 \leq 0.0004$; and the photo spacer further comprises auxiliary photo spacers, one end of each of the auxiliary photo spacers fixedly connects to the substrate, an outer edge of the other end of each of the auxiliary photo spacers encloses to form an area A3, and A1 and A3 satisfy a relationship: $1/100 < A3/A1 \leq 1$, the auxiliary photo spacer and the main photo spacer are separated from each other by at least one unit pixel area.

16. The display device according to claim 15, wherein A1 and A2 satisfy the relationship: $0.0002 \leq A2/A1 \leq 0.0003$;

and/or, A1 and A3 satisfy the relationship: $0.8 \leq A3/A1 \leq 0.9$.

17. The display device according to claim 16, wherein the photo spacer is a columnar block or a tapered block, and A2 is an area of an end surface of the main photo spacer away from the substrate;

A3 is an area of an end surface of the auxiliary photo spacer away from the substrate.

18. The display device according to claim 17, wherein the unit pixel region comprises a light shielding layer attached to a surface of the substrate, the light shielding layer defines a light transmission part, the unit pixel region further comprises a color filter layer covering the light transmission part, and A1 is the area formed by enclosing an outer contour of a projection of the light shielding layer on the substrate.

* * * * *